US008818287B2

(12) United States Patent
Saito

(10) Patent No.: US 8,818,287 B2
(45) Date of Patent: Aug. 26, 2014

(54) COMMUNICATION APPARATUS AND CONTROL METHOD THEREOF

(75) Inventor: Katsuo Saito, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 244 days.

(21) Appl. No.: 12/965,639

(22) Filed: Dec. 10, 2010

(65) Prior Publication Data

US 2011/0143678 A1 Jun. 16, 2011

(30) Foreign Application Priority Data

Dec. 15, 2009 (JP) ................................ 2009-284570

(51) Int. Cl.
*H04B 17/00* (2006.01)

(52) U.S. Cl.
USPC ....... 455/67.11; 455/41.2; 455/121; 343/745; 343/750

(58) Field of Classification Search
USPC ............ 455/41.1–41.3, 67.11, 121, 522, 523, 455/562.1; 343/745, 750, 853, 857, 858
See application file for complete search history.

(56) References Cited

U.S. PATENT DOCUMENTS

| | | | | |
|---|---|---|---|---|
| 7,760,676 | B2 * | 7/2010 | Demirhan et al. | 370/311 |
| 8,023,890 | B2 * | 9/2011 | Washiro | 455/41.1 |
| 8,121,019 | B2 * | 2/2012 | Tsutsui | 370/204 |
| 2007/0093282 | A1 * | 4/2007 | Chang et al. | 455/575.7 |
| 2008/0076351 | A1 | 3/2008 | Washiro | |
| 2009/0096683 | A1 * | 4/2009 | Rosenblatt et al. | 343/702 |

FOREIGN PATENT DOCUMENTS

| | | | |
|---|---|---|---|
| JP | 7-007357 | A | 1/1995 |
| JP | 2004-355212 | A | 12/2004 |
| JP | 2008-271606 | A | 11/2008 |

OTHER PUBLICATIONS

Office Action issued on Nov. 26, 2013, in counterpart Japanese Application No. 2009-284570.

* cited by examiner

*Primary Examiner* — Tuan H Nguyen
(74) *Attorney, Agent, or Firm* — Carter, DeLuca, Farrell & Schmidt, LLP

(57) ABSTRACT

A communication apparatus including a first antenna and performing wireless communication in which a reflected power from the first antenna changes depending on a positional relationship between the first antenna of the communication apparatus and a second antenna of a communication partner. The communication apparatus further includes a transmission unit configured to transmit a data signal to the communication partner via the first antenna, a determination unit configured to determine a reflected power generated when the transmission unit supplies the data signal to the first antenna, and a control unit configured to control the transmission of the data signal by the transmission unit, based on the reflected power determined by the determination unit.

14 Claims, 11 Drawing Sheets

FIG. 8A

801

SMALLER → LARGER (reflected power); HIGHER → LOWER (transmission rate)

| REFLECTED POWER (W) | TRANSMISSION RATE |
|---|---|
| W < W1 | Rate1 |
| W1 ≤ W <W2 | Rate2 |
| W2 ≤ W <W3 | Rate3 |

FIG. 8B

802

SMALLER → LARGER (reflected power); SHORTER → LONGER (transmission period)

| REFLECTED POWER (W) | TRANSMISSION PERIOD |
|---|---|
| W < W1' | T1 |
| W1' ≤ W <W2' | T2 |
| W2' ≤ W <W3' | T3 |

FIG. 8C

803

SMALLER → LARGER (reflected power); LONGER → SHORTER (transmission period)

| REFLECTED POWER (W) | TRANSMISSION PERIOD |
|---|---|
| W < W1' | T3' |
| W1' ≤ W <W2' | T2' |
| W2' ≤ W <W3' | T1' |

COMMUNICATION APPARATUS AND CONTROL METHOD THEREOF

BACKGROUND OF THE INVENTION

1. Field of the Invention

The present invention relates to a communication apparatus that performs wireless communication.

2. Description of the Related Art

If a mismatch (difference) exists between impedance of an antenna used in wireless communication and impedance of a transmission unit connected to the antenna, when the transmission unit supplies a data signal to the antenna, the antenna reflects a wave. The larger the impedance mismatching, the larger the intensity (reflected power) of the reflected wave and the smaller the intensity of the radio wave emitted from the antenna. In view of this, Japanese Patent Application Laid-Open No. 7-7357 discusses a configuration to reduce intensity of the reflected wave. Based on the configuration, the mismatch between impedance of the antenna and impedance of the transmission unit is minimized based on intensity of the reflected wave.

In relation to antennas, a technique enabling wireless communication by bringing antennas close to each other is widely used. For example, Japanese Patent Application Laid-Open No. 2008-271606 discusses such a technique. Based on a configuration discussed in this application, an antenna of a user apparatus and that of a communication partner are faced with each other so that the pair of opposed antennas operates as a capacitor. These antennas form an induction electric field therebetween to communicate with each other.

As described above, impedance mismatching between an antenna and a transmission unit generates a reflected wave. However, when the antennas are brought close to each other for communication, since the above pair of opposed antennas operates as a capacitor, the impedance between the antennas changes depending on a positional relationship between the user apparatus and the communication antenna. As a result, a reflected wave is generated.

SUMMARY OF THE INVENTION

The present invention is directed to a communication apparatus that performs wireless communication in which a reflected power changes depending on a positional relationship between the antennas and that controls transmission of a data signal based on the reflected power.

The present invention provides a communication apparatus including a first antenna and performing wireless communication in which a reflected power from the first antenna changes depending on a positional relationship between the first antenna of the communication apparatus and a second antenna of a communication partner. The communication apparatus further includes: a transmission unit configured to transmit a data signal to the communication partner via the first antenna; a determination unit configured to determine a reflected power generated when the transmission unit supplies the data signal to the first antenna; and a control unit configured to control the transmission of the data signal by the transmission unit, based on the reflected power determined by the determination unit.

According to the present invention, the communication apparatus that performs wireless communication in which a reflected power changes depending on a positional relationship between the antennas, controls transmission of a data signal based on the reflected power. Thus, the communication apparatus does not need to acquire any information from the communication partner to control transmission of the data signal.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8A is a table illustrating a relationship between the reflected power and a transmission rate, and FIGS. 8B and 8C are tables each illustrating a relationship between the reflected power and a transmission period.

DESCRIPTION OF THE EMBODIMENTS

Various exemplary embodiments, features, and aspects of the invention will be described in detail below with reference to the drawings.

Figure 1:
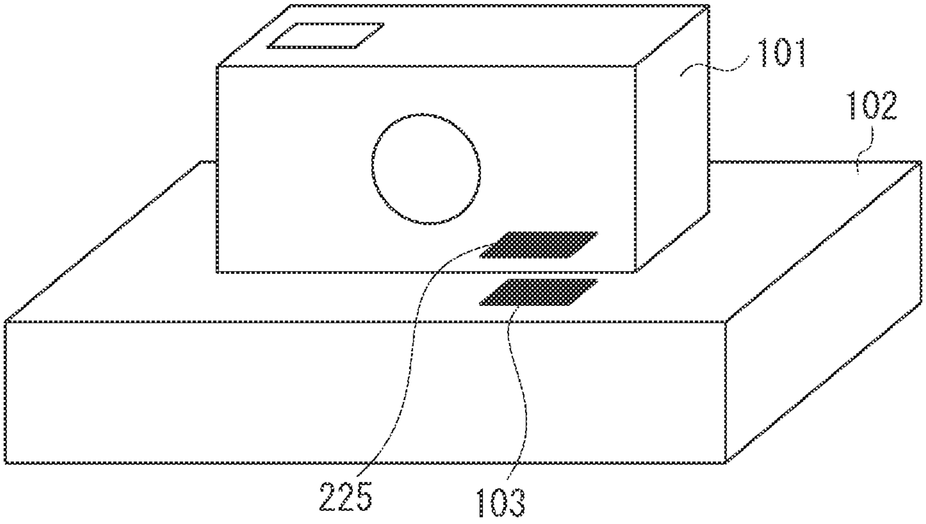
FIG. 1 is a system configuration diagram.

FIG. 1 is a system configuration diagram according to a first exemplary embodiment. A digital camera 101 is a communication apparatus including an antenna 225 (first antenna unit). A cradle 102 is another communication apparatus (communication partner) including an antenna 103 (second antenna unit) and communicating with the digital camera 101 via the antenna 103. In the first exemplary embodiment, the digital camera 101 and the cradle 102 wirelessly communicate with each other based on Transfer Jet (registered trademark) using induction electric fields.

Figure 2A:
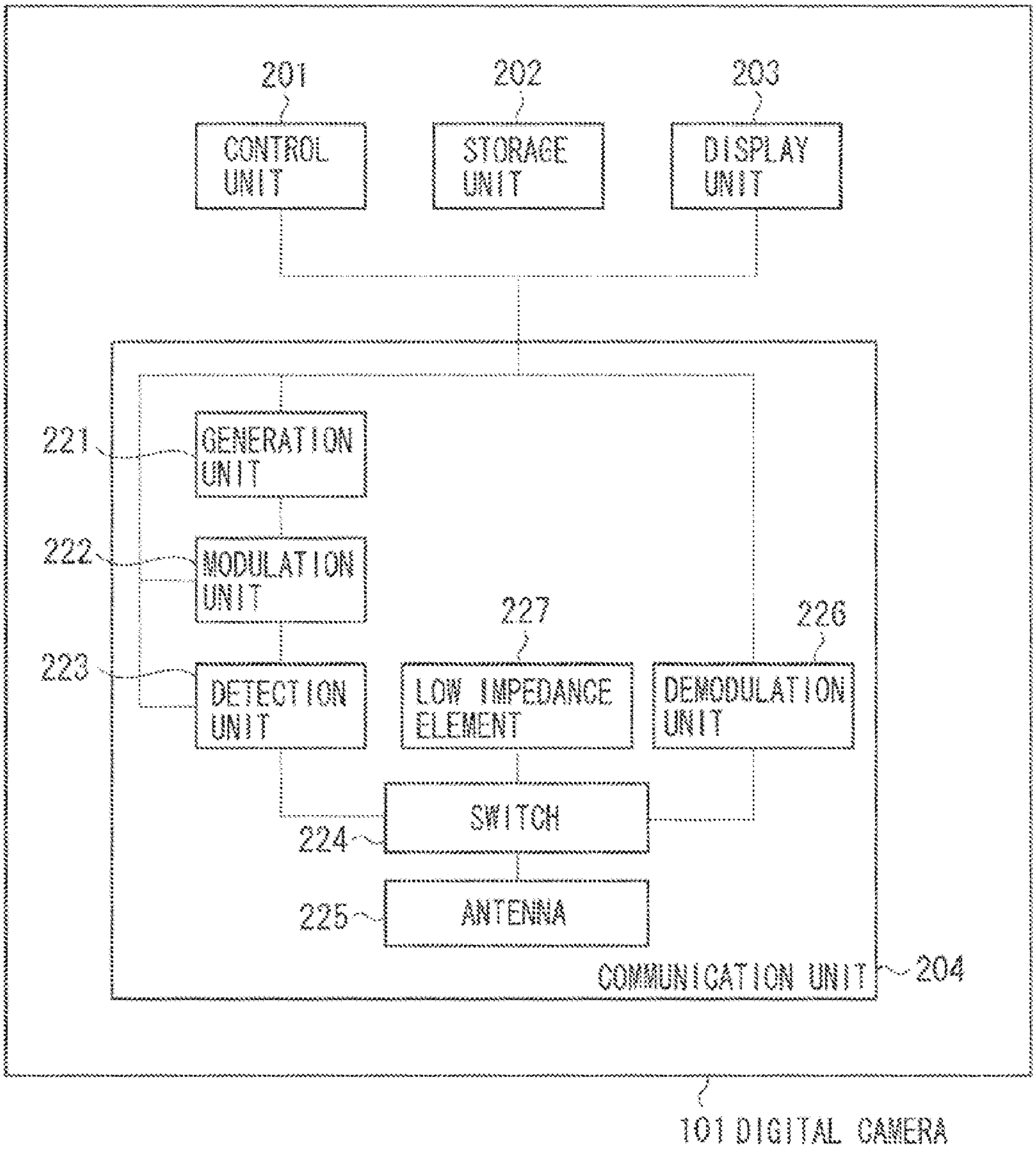
FIGS. 2A and 2B illustrate hardware configurations of a digital camera.
Figure 2B:
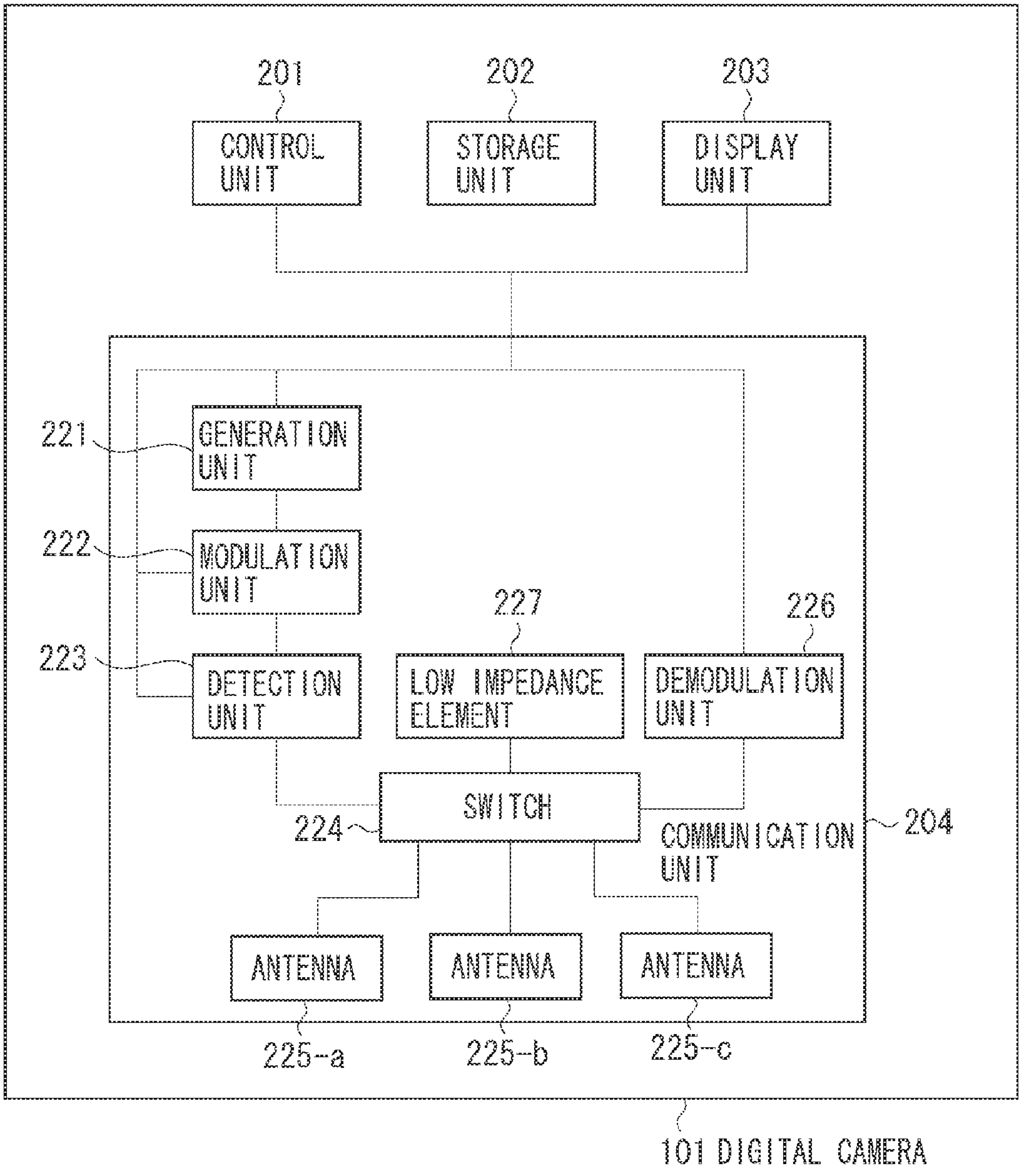

While FIG. 2A illustrates a hardware configuration of the digital camera 101, the cradle 102 has the same hardware configuration. FIG. 2B illustrates another configuration of the digital camera 101 according to a third exemplary embodiment, which will be described later.

In FIG. 2A, a control unit 201 includes a central processing unit (CPU) and executes programs stored in a storage unit 202. The storage unit 202 includes a random access memory (RAM) and a read-only memory (ROM) and stores various tables and programs which will be described later. A display unit 203 is a display notifying users of information. A communication unit 204 is configured by various hardware components to perform wireless communication with the communication partner 102. Since FIG. 2A illustrates a hardware configuration of the digital camera 101, the communication unit 204 performs wireless communication with the cradle 102. Next, the hardware components of the communication unit 204 will be described.

A generation unit 221 generates and transmits a data signal to a modulation unit 222. Not only a data signal includes a payload such as a video or an audio signal, but may also include various control signals having no payload. The modulation unit 222 executes a certain modulation processing (phase modulation or multiplication of spread codes, for example) on the data signal received from the generation unit 221. The modulation unit 222 supplies the modulated data signal to the planar antenna (conductor electrode) 225 via a detection unit 223 and a switch 224. The detection unit 223 detects a reflected wave generated when supplying the data signal to the antenna 225. The reflected wave is a wave that returns from the antenna 225, instead of being emitted from the antenna 225, when the detection unit 223 supplies the high-frequency data signal to the antenna 225. If the detection unit 223 detects such reflected wave, the detection unit 223 determines intensity (reflected power) of the detected reflected wave.

When transmitting the data signal to the cradle 102, the switch 224 connects the modulation unit 222 to the antenna 225. When receiving a data signal from the cradle 102, the switch 224 connects a demodulation unit 226 to the antenna 225. The antenna 225 forms an induction electric field with the antenna 103 of the cradle 102 to transmit/receive a modulated data signal to/from the cradle 102. Further, when the power source of the communication unit 204 is disconnected, the switch 224 connects the antenna 225 to a low impedance element 227 (0Ω, for example). Alternatively, the switch 224 may connect the antenna 225 to a high impedance element (1 kΩ, for example), instead of the low impedance element 227.

When the digital camera 101 receives a data signal from the cradle 102 via the antenna 225, the antenna 225 supplies the data signal to the demodulation unit 226 via the switch 224. After receiving the data signal from the antenna 225, the demodulation unit 226 executes a certain demodulation processing on the data signal. The demodulation unit 226 sends the demodulated data signal to the storage unit 202.

Figure 3A:
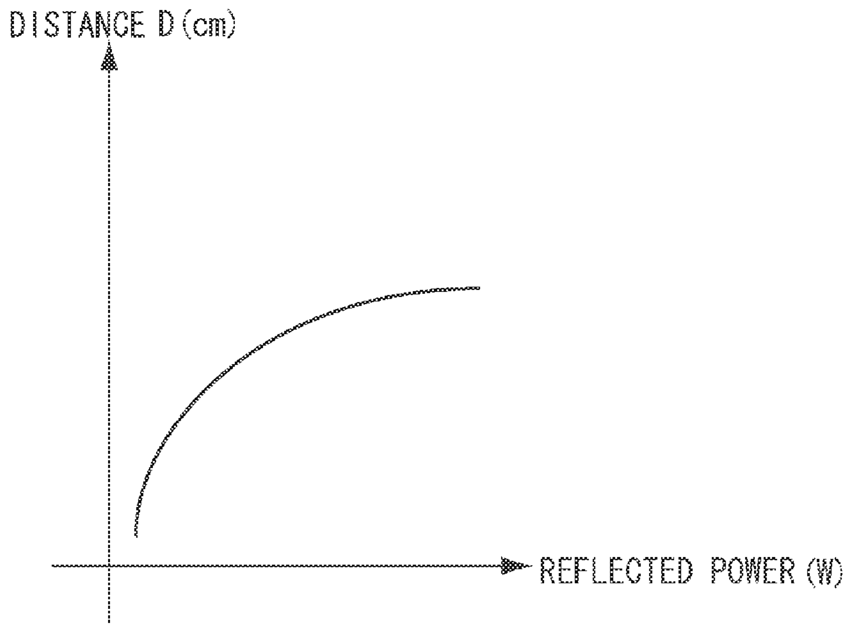
FIG. 3A illustrates a relationship between a reflected power and a distance between two antennas.
Figure 3B:
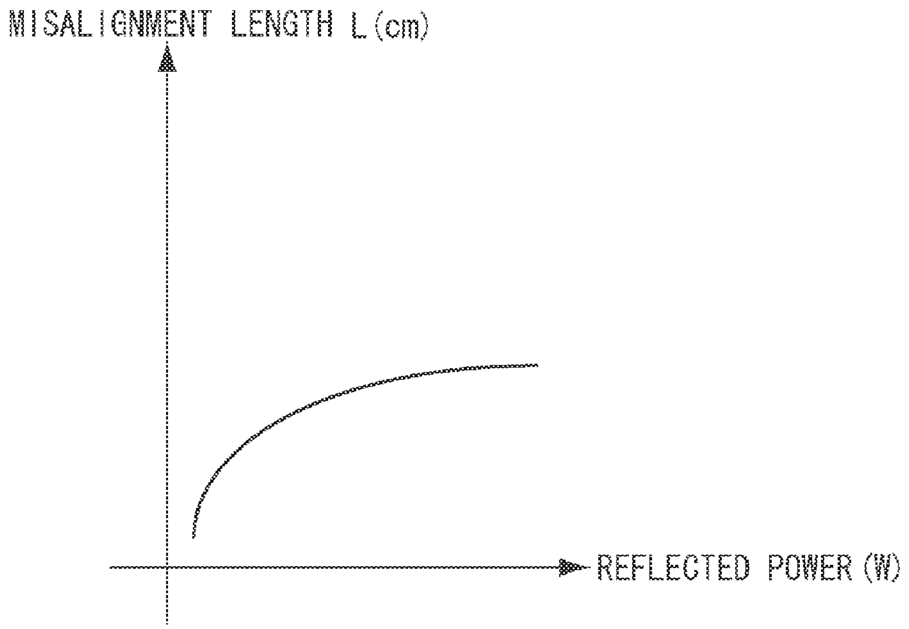
FIG. 3B illustrates a relationship between the reflected power and a misalignment length between two antennas.
Figure 4A:
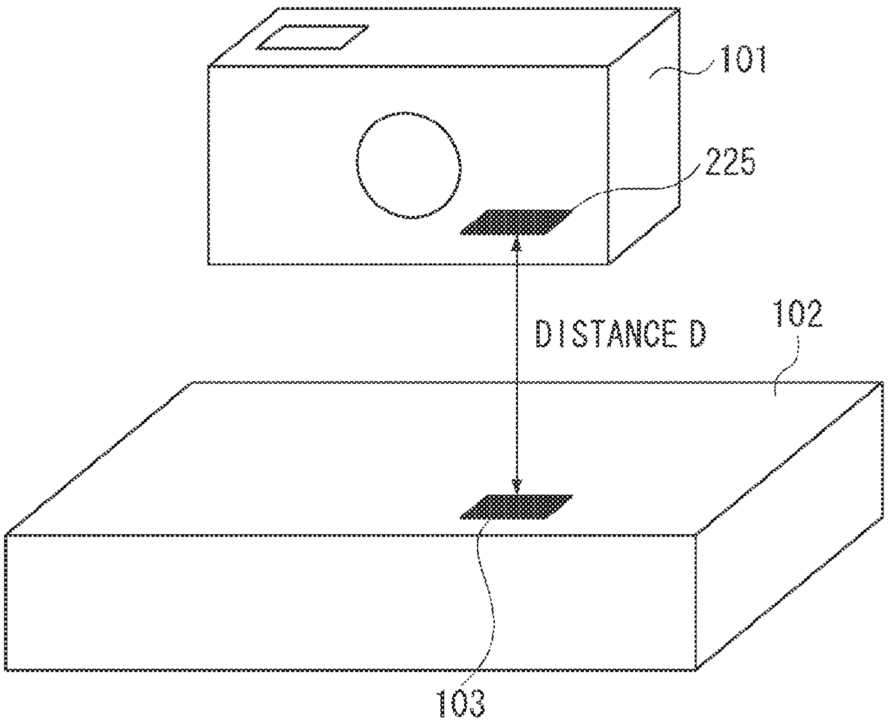
FIGS. 4A and 4B illustrate the distance and the misalignment length between two antennas, respectively.
Figure 4B:
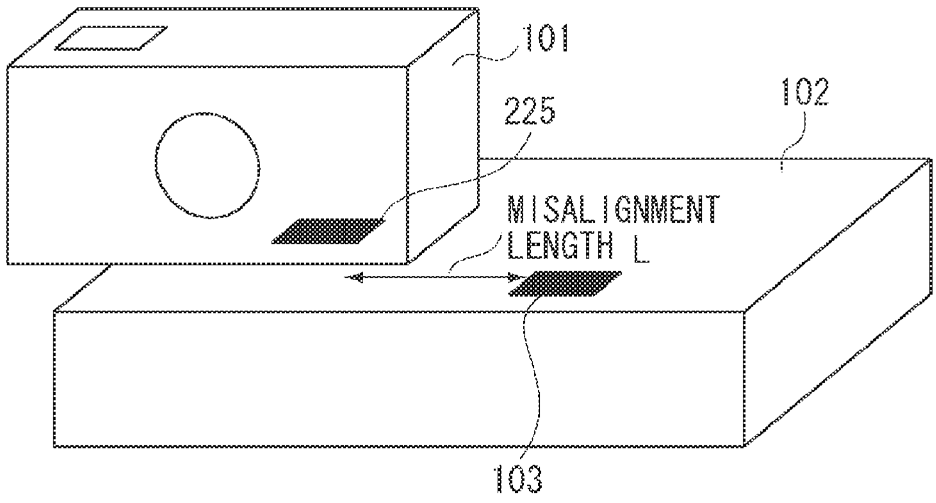

FIG. 3A illustrates a relationship between the reflected power and a distance D between the antenna 225 of the digital camera 101 and the antenna 103 of the cradle 102. FIG. 4A illustrates the distance D between the antennas 225 and 103 more specifically. As is clear from FIG. 3A, the larger the reflected power, the greater the distance D between the antennas 225 and 103. Further, FIG. 3B illustrates a relationship between the reflected power and a misalignment length L between the antenna 205 of the digital camera 101 and the antenna 103 of the cradle 102. FIG. 4B illustrates the misalignment length L between the antennas 225 and 103 more specifically. As is clear from FIG. 3B, the larger the reflected power, the greater the misalignment length L between the antennas 225 and 103.

Figure 5:
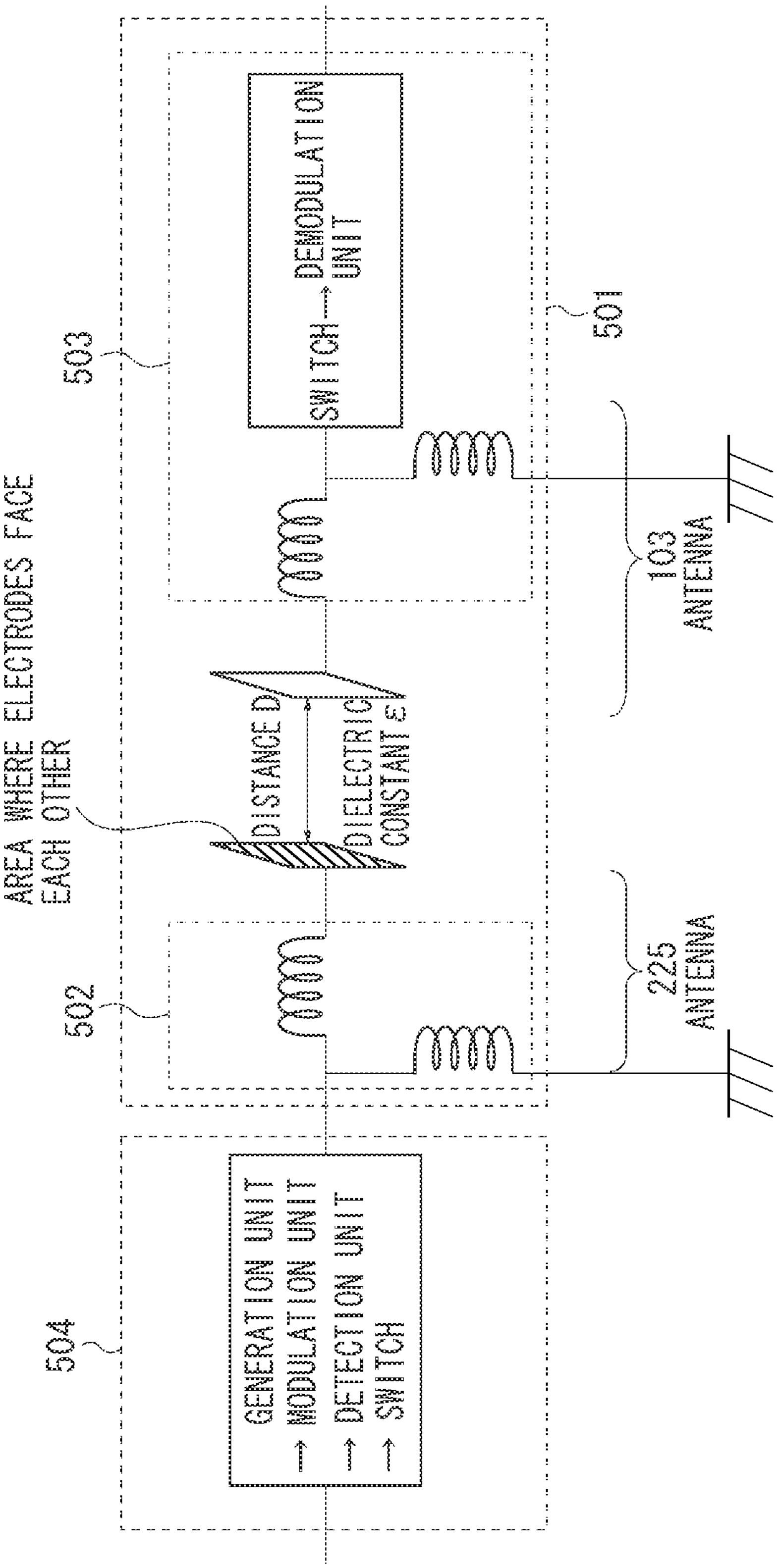
FIG. 5 illustrates two antennas facing each other.

Next, how the reflected power relates to the distance D and the misalignment length L will be briefly described. FIG. 5 illustrates the antenna 225 of the digital camera 101 and the antenna 103 of the cradle 102 facing each other. Assuming that the electrodes of both of the antennas 225 and 103 are a single plate capacitor, capacitance C of the plate capacitor formed by the electrodes of both of the antennas 225 and 103 can be represented by equation 1.

$$C = \varepsilon\frac{S}{D} \qquad \text{Equation 1}$$

The above equation 1 is represented by a dielectric constant ∈, the distance D between the electrodes of the antennas 225 and 103, and an area S where the electrodes of the antennas 225 and 103 face each other. As is clear from equation 1, the greater the distance D is, the smaller the capacitance C of the capacitor becomes. Further, the more the antennas 225 and 103 are misaligned with each other (the greater the misalignment length L is), the more the area where the electrodes face each other is reduced (the smaller the area S becomes). As a result, the capacitance C of the capacitor is decreased.

A synthetic impedance Z of both the antennas 225 and 103 and a receiving circuit 503 of the cradle 102 can be represented by equation 2.

$$Z = \left|\dot{Z}_1 + \frac{1}{j\omega c} + \dot{Z}_2\right| \quad \text{|| indicates an absolute value} \qquad \text{Equation 2}$$

In equation 2, a synthetic impedance Z1 of a circuit 502 and a synthetic impedance Z2 of a circuit 503 have a fixed value. The dots in equation 2 indicate that the impedances Z1 and Z2 are complex impedances. In the above equation 2, an imaginary unit j, a high frequency ω, and the above capacitor capacitance C are used. As is clear from equation 2, the more widely the antennas 225 and 103 are separated or misaligned, the smaller the capacitor capacitance C becomes and the greater the synthetic impedance Z becomes.

The synthetic impedance Z is set to match a specific synthetic impedance Z0 of the digital camera 101 (circuit 504) when the distance D between the antennas 225 and 103 is approximately 3 centimeters. Thus, if the antennas 225 and 103 are separated or misaligned more widely, the synthetic impedance Z is changed. As a result, mismatching is caused between the synthetic impedance Z and the fixed synthetic impedance Z0 of the digital camera 101. The intensity of the reflected wave is increased as the level of impedance mismatching increases. Namely, the greater the distance D or the misalignment length L is, the larger the reflected power becomes.

Figure 6A:
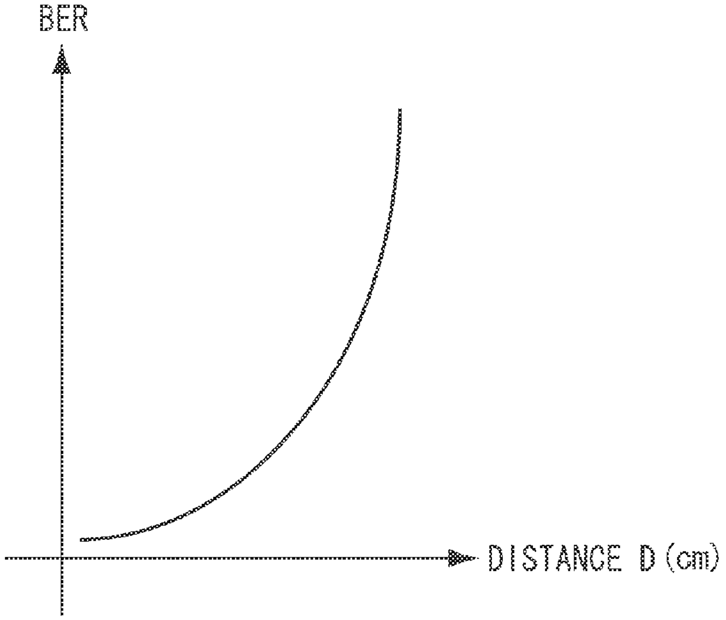
FIG. 6A illustrates a relationship between a bit error ratio (BER) and the distance between two antennas.
Figure 6B:
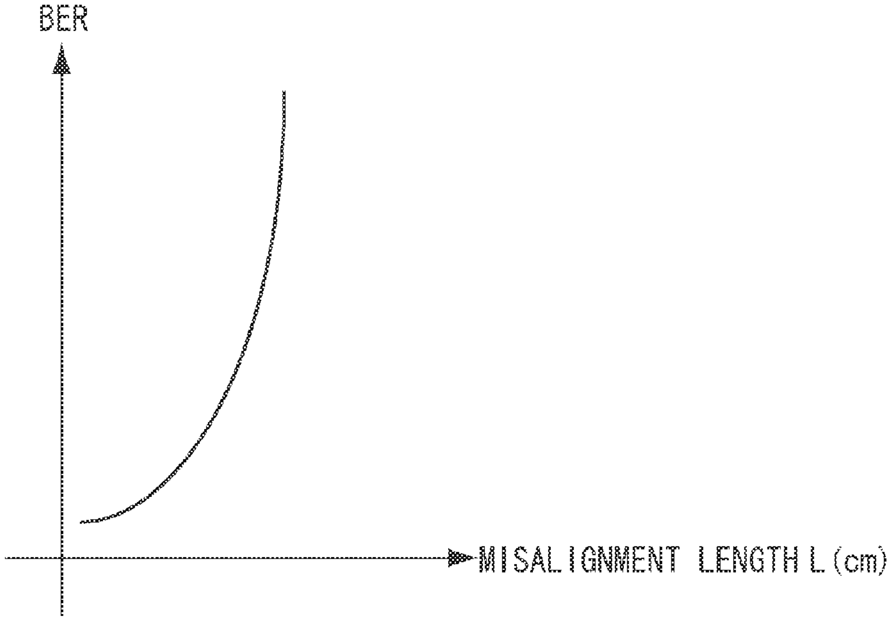
FIG. 6B illustrates a relationship between the BER and the misalignment length between two antennas.

FIG. 6A illustrates a relationship between the distance 1) between the antennas 225 and 103 and the bit error rate (BER). As is clear from FIG. 6A, the greater the distance D between the antennas 225 and 103 is, the higher the BER becomes. FIG. 6B illustrates a relationship between the misalignment length L between the antennas 225 and 103 and the BER. As is clear from FIG. 6B, the greater the misalignment length L between the antennas 225 and 103 is, the higher the BER becomes.

It is estimated from FIGS. 3 and 6 that the larger the reflected power is, the larger the distance D or the misalignment length L between the antennas 225 and 103 becomes and the higher the BER becomes. This is because the reflected power is inversely proportional to the power transmitted from the antenna 225. In addition, an analysis confirmed that the reflected power is increased when the power source of the communication partner 102 is disconnected. This is because, since the antenna 103 of the communication partner 102 is connected to the low impedance element when the power source is disconnected, impedance mismatching is caused.

Figure 7:
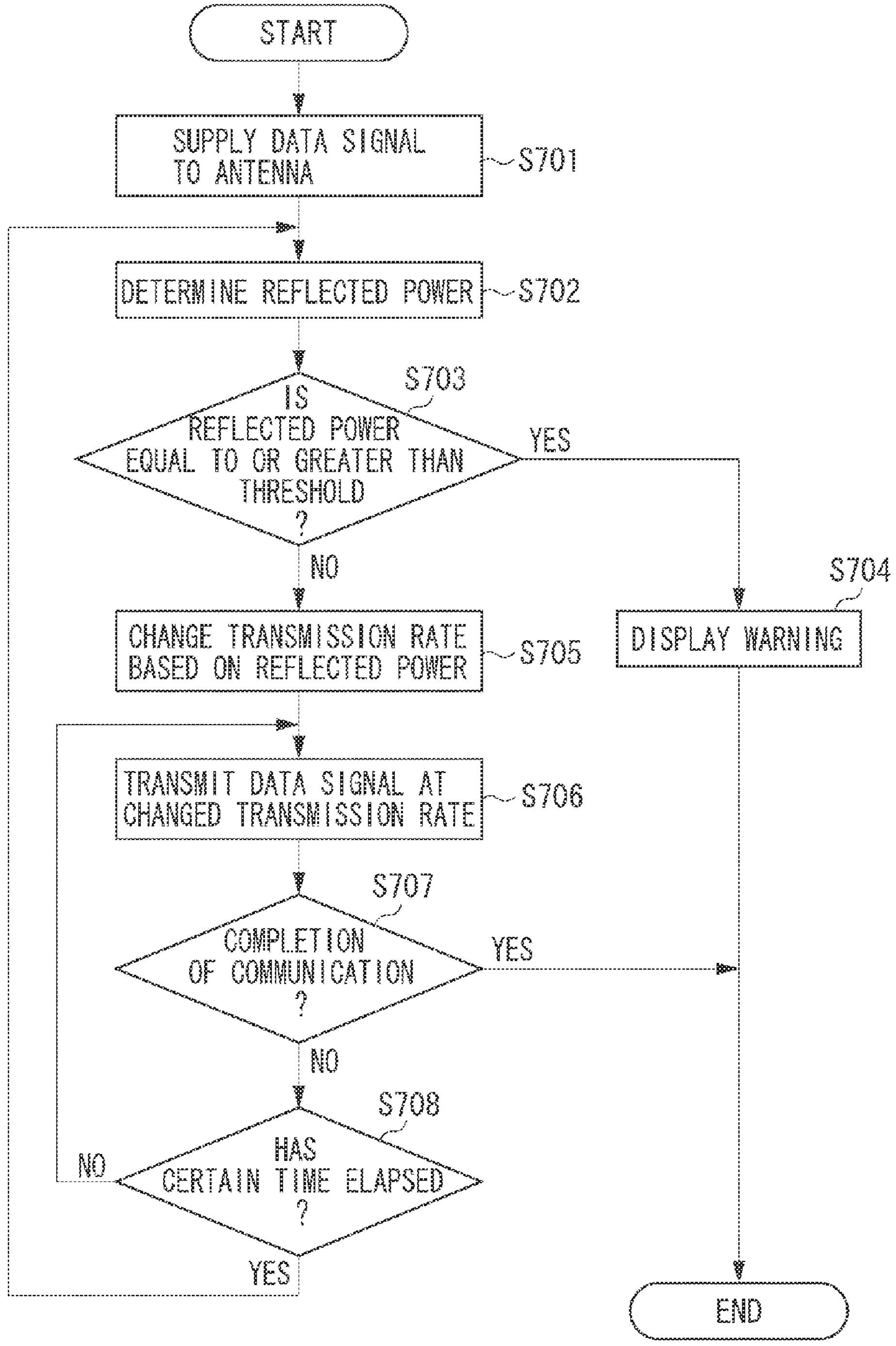
FIG. 7 is a flow chart of an operation during communication.

FIG. 7 is a flow chart illustrating an operation executed by the control unit 201 reading programs stored in the storage unit 202. The control unit 201 executes the operation illustrated by the flow chart when the digital camera 101 starts communication with the communication partner 102.

First, in step S701, the control unit 201 instructs the generation unit 221 to generate a data signal and supply the generated data signal to the antenna 225 via the modulation unit 222, the detection unit 223, and the switch 224. The antenna 225 transmits the supplied data signal to the communication partner 102. Next, in step S702, the detection unit 223 detects a reflected wave generated when transmitting the data signal to the antenna 225 and determines intensity (reflected power W) of the detected reflected wave. In addition, the detection unit 223 causes the storage unit 202 to store the determined reflected power. Next, in step S703, the control unit 201 determines whether the reflected power stored in the storage unit 202 is equal to or greater than a certain threshold W3. If the reflected power is equal to or greater than the certain threshold W3 (YES in step S703), the operation proceeds to step S704. If not (NO in step S703), the operation proceeds to step S705.

If the reflected power is equal to or greater than the certain threshold W3 (YES in step S703), it is estimated from FIGS. 3 and 6 that the distance D or the misalignment length L between the antennas 225 and 103 is great (i.e., the antennas 225 and 103 are widely separated from each other) and the BER is high. A high BER often causes a frequent occurrence of re-transmission and a decrease of communication speed. In some cases, the communication may be disconnected. Thus, in step S704, the control unit 201 instructs the display unit 203 to display a warning that the antenna 103 of the communication partner 102 is not present nearby. For example, the display unit 203 displays a message "Please adjust the antenna position." In this way, the user can easily recognize that the antenna 103 of the communication partner 102 is not present nearby. In addition, the user can adjust the position of each of the antennas 225 and 103 in accordance with such a warning. In addition, when the power source of the communication partner 102 is disconnected and the reflected power is thereby increased, since the display unit 203 promptly displays a warning to the user, the user can recognize the abnormal condition promptly.

In step S705, based on the reflected power and a transmission rate table 801 stored in the storage unit 202, the control unit 201 changes a transmission rate (transmission speed) at which the data signal is transmitted. FIG. 8A illustrates the transmission rate table 801 indicating a relationship between the reflected power and the transmission rate. In step S705, if the reflected power is less than W1, the control unit 201 sets the transmission rate to Rate1. If the reflected power is equal to or greater than W1 and less than W2, the control unit 201 sets the transmission rate to Rate2. If the reflected power is equal to or greater than W2 and less than W3, the control unit 201 sets the transmission rate to Rate3. The reflected power W3 is the largest, and the reflected power W2 is larger than the reflected power W1 (W3>W2>W1). The transmission rate Rate1 is the highest, and the transmission rate Rate2 is higher than the transmission rate Rate3 (Rate1>Rate2>Rate3). In the first exemplary embodiment, the modulation unit 222 changes the transmission rate by changing coding systems, modulation systems, spread codes, or the like. In addition, the lower the transmission rate is, the better the error tolerance becomes.

Namely, in the first exemplary embodiment, when the reflected power is larger, that is, when the antennas 225 and 103 are separated more widely, the control unit 201 sets a lower transmission rate. In this way, the error tolerance can be improved. Thus, the digital camera 101 can stably communicate with the communication partner 102, without acquiring information about the reception status of the communication partner 102 (Ack, re-transmission request, BER information, and the like) from the communication partner 102. Namely, the processing load of the communication partner 102 can be reduced. Further, instead of re-transmitting a data signal many times because of an error, the communication apparatus 101 simply needs to transmit a data signal only once to change the transmission rate. Thus, the processing load of both the communication apparatus 101 and the communication partner 102 can be reduced, thereby reducing power consumption thereof.

In step S706, the control unit 201 instructs the modulation unit 222 to modulate the data signal, and the detection unit 223 transmits the data signal to the communication partner 102 at the changed transmission rate via the antenna 225. Next, in step S707, the control unit 201 determines whether the communication with the cradle 102 has been completed. If the communication has been completed (YES in step S707), the control unit 201 ends the flow chart of FIG. 7. If not (NO in step S707), in step S708 the control unit 201 determines whether a certain time has elapsed since the change of the transmission rate. If the certain time has elapsed (YES in step S708), the operation returns to step S702, and the detection unit 223 determines the reflected power. On the other hand, if the certain time has not elapsed yet (No in step S708), the operation returns to step S706 and the detection unit 223 continues transmission of the data signal. In this way, the control unit 201 can change the transmission rate in accordance with change of the positional relationship between the antennas 225 and 103 during communication.

As described above, the communication apparatus 101 determines the reflected power generated when transmitting a signal to the communication partner 102. Thus, without acquiring information about the reception status of the communication partner 102 from the communication partner 102, the communication apparatus 101 can estimate the positional relationship with the communication partner 102 or the BER and can change the transmission rate. In addition, since the communication partner 102 does not need to notify the communication apparatus 101 of information about any reception status, the processing load of the communication partner 102 is reduced. In addition, since the control unit 201 can change the transmission rate through a single signal transmission, time required to determine change of the transmission rate is shortened. Particularly, when compared with cases where the communication apparatus 101 changes the transmission rate after receiving a re-transmission request many times, time required to change the transmission rate can be shortened significantly. In addition, since the communication partner 102 does not need to transmit a re-transmission request many times, the processing load of the communication partner 102 is reduced. In addition, for example, since the communication partner 102 does not need to transmit information about the BER, the communication protocol can be simplified. Further, when the power source of the communication partner 102 is disconnected, the communication apparatus 101 detects a larger reflected power. However, in such case, since the display unit promptly displays a warning to the user, the user can recognize the abnormal condition promptly.

In the first exemplary embodiment, the control unit 201 changes the transmission rate based on the reflected power. However, the present invention is not limited to such example. For example, a reflection coefficient (voltage standing wave ratio (VSWR)) may be calculated based on the determined reflected power, and the transmission rate may be changed based on the calculated reflection coefficient. Alternatively, the distance D or the misalignment length L between the antennas 225 and 103 may be determined based on the reflected power, and the transmission rate may be changed based on the determined distance D or misalignment length L. Further alternatively, transmission loss between the antennas 225 and 103 may be estimated based on the determined distance D or misalignment length L, and the transmission rate may be changed based on the estimated transmission loss. In any case, the control unit 201 changes the transmission rate based on the reflected power.

The first exemplary embodiment can be realized only by hardware components of the communication unit 204. In such case, the individual components of the communication unit 204 operate as follows.

The generation unit 221 generates a data signal and supplies the generated data signal to the antenna 225 via the modulation unit 222, the detection unit 223, and the switch 224. Next, the antenna 225 transmits the supplied data signal to the communication partner 102 (corresponding to step S701). The detection unit 223 detects a reflected wave generated when transmitting the data signal to the antenna 225 and determines intensity (reflected power W) of the detected reflected wave (corresponding to step S702). Next, the detection unit 223 notifies the modulation unit 222 of the determined reflected power. Subsequently, the generation unit 221 supplies the data signal to the modulation unit 222, and the modulation unit 222 modulates the data signal based on the supplied reflected power and the stored transmission rate table 801. Next, the modulation unit 222 supplies the modulated data signal to the antenna 225 (corresponding to step S706). The antenna 225 transmits the supplied data signal to the cradle 102. By configuring the communication unit 204 in this way, the same advantageous effects can be obtained.

In the first exemplary embodiment, the control unit 201 changes the transmission rate based on the reflected power. In the second exemplary embodiment, the control unit 201 changes a connection request transmission interval based on the reflected power.

The hardware configuration of a digital camera according to the second exemplary embodiment is similar to that of the digital camera 101 according to the first exemplary embodiment. Thus, in FIGS. 2A and 2B, identical units are denoted by identical reference characters, and detailed description thereof will be omitted.

Figure 9:
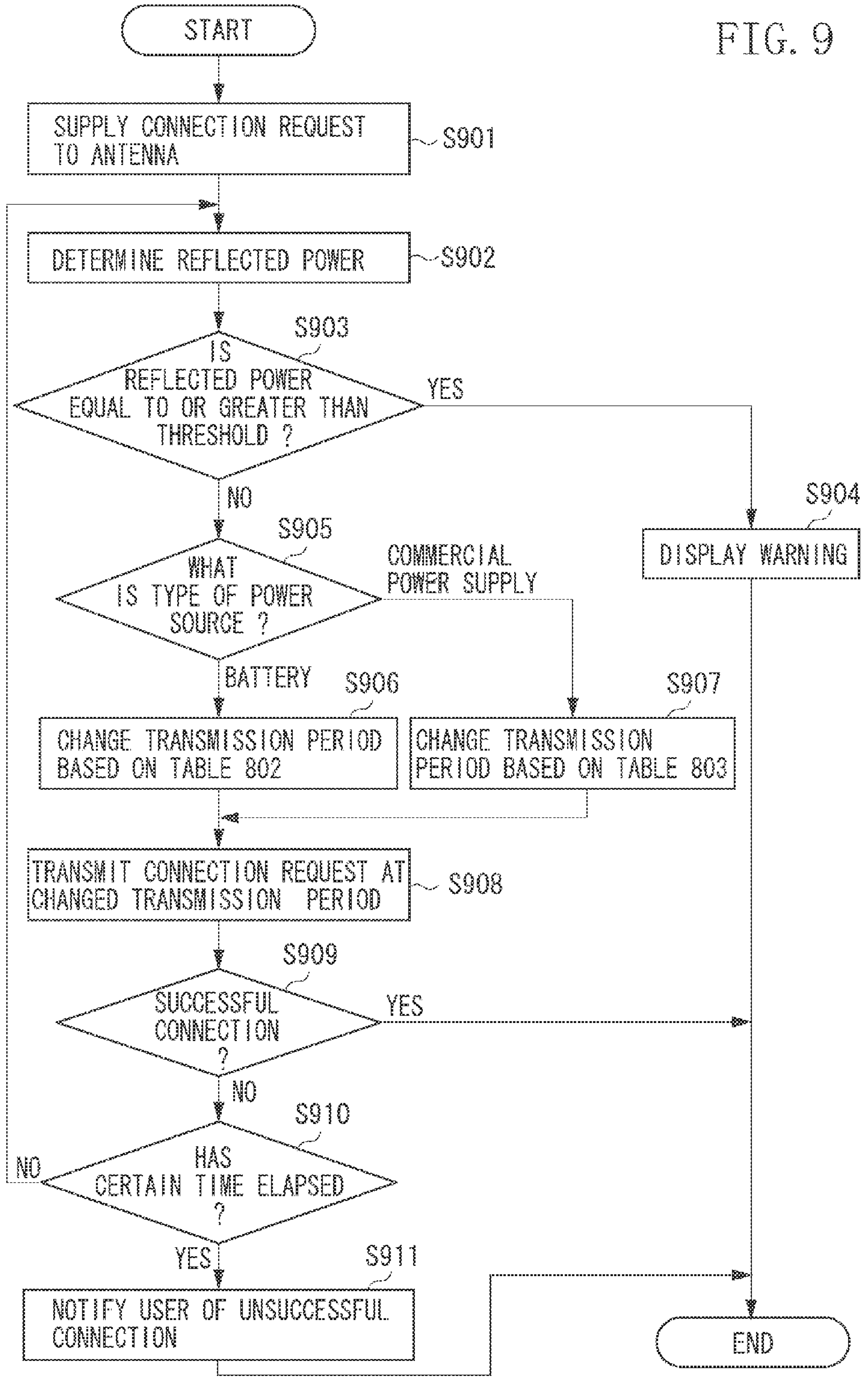
FIG. 9 is a flow chart illustrating connection processing.

FIG. 9 is a flow chart illustrating an operation executed by the control unit 201 reading programs stored in the storage unit 202. The control unit 201 executes the operation illustrated in the flow chart when a user instructs the digital camera 101 to start communication. For example, the user gives an instruction to start communication, by pressing an operation member such as a button (not illustrated).

First, in step S901, the generation unit 221 generates a connection request as a data signal and supplies the connection request to the antenna 225 via the modulation unit 222, the detection unit 223, and the switch 224. Next, the antenna 225 transmits the supplied connection request. In step S902, the detection unit 223 detects a reflected wave generated when transmitting the connection request to the antenna 225 and determines intensity (reflected power W) of the detected reflected wave. In addition, the detection unit 223 causes the storage unit 202 to store the determined reflected power. In step S903, the control unit 201 determines whether the reflected power stored in the storage unit 202 is equal to or greater than a certain threshold W3'. If the reflected power is equal to or greater than the certain threshold W3' (YES in step S903), the operation proceeds to step S904. If not (NO in step S903), the operation proceeds to step S905.

If the reflected power is equal to or greater than the certain threshold W3' (YES in step S903), it is estimated from FIG. 3 that the distance D or the misalignment length L between the antennas 225 and 103 is large. Thus, in step S904, the display unit 203 displays a warning that the antenna 103 of the communication partner 102 is not present nearby. In this way, without repetitive transmission of a connection request, the user can recognize that the antenna 103 of the communication partner 102 is not present nearby, and thus reduction of power consumption can be achieved.

In step S905, the control unit 201 determines whether the power source of the digital camera 101 is a commercial power supply or a battery. If the power source is a battery (BATTERY in step S905), the operation proceeds to step S906, and if not (COMMERCIAL POWER SUPPLY in step S905), the operation proceeds to step S907.

In step S906, the control unit 201 changes the connection request transmission period, based on the reflected power and a transmission period table 802 stored in the storage unit 202. FIG. 8B illustrates the transmission period table 802 indicating a relationship between the reflected power and the connection request transmission period. If the reflected power is less than W1', the control unit 201 sets the connection request transmission period to T1. If the reflected power is equal to or greater than W1' and less than W2', the control unit 201 sets the connection request transmission period to T2. If the reflected power is equal to or greater than W2' and less than W3', the control unit 201 sets the connection request transmission period to T3. The reflected power W3' is the greatest, and the reflected power W2' is greater than the reflected power W1' (W3'>W2'>W1'). Further, the period T1 is the shortest, and the period T2 is shorter than the period T3 (T1<T2<T3).

Namely, when the digital camera 101 is driven by a battery, if the antennas 225 and 103 are separated more widely, the control unit 201 sets a longer connection request transmission period.

When the antennas are widely separated from each other, the BER is high. Thus, even if the digital camera 101 transmits a connection request many times, the digital camera 101 has a low probability of establishing connection with the communication partner 102. Namely, when the antennas 225 and 103 are widely separated from each other, repetitive transmission of a connection request may result in waste of power. In view of this, in the second exemplary embodiment, when the digital camera 101 is driven by a battery, the wider the antennas 225 and 103 are separated from each other, the longer connection request transmission period set by the control unit 201. In other words, the digital camera 101 gives priority to reduction of power consumption. On the other hand, since the digital camera 101 has a higher probability of establishing connection with the communication partner 102 when the antennas 225 and 103 are close to each other, communication efficiency can be increased during subsequent communication.

Alternatively, when the reflected power is equal to or greater than W2' and less than W3', the digital camera 101 may transmit another signal different from the connection request. In this way, when the antennas 225 and 103 are separated from each other and the BER is high, the digital camera 101 does not establish connection with the communication partner 102. In this way, since the probability of establishing connection is further increased when the antennas 225 and 103 are close to each other, communication efficiency can be increased during subsequent communication.

On the other hand, if the power source of the digital camera 101 is a commercial power supply (COMMERCIAL POWER SUPPLY in step S905), in step S907, the control unit 201 changes the connection request transmission period based on the reflected power and a transmission period table 803 stored in the storage unit 202. FIG. 8C illustrates the transmission period table 803 indicating a relationship between the reflected power and the connection request transmission period. If the reflected power is less than W1', the control unit 201 sets the connection request transmission period to T3'. If the reflected power is equal to or greater than W1' and less than W2', the control unit 201 sets the connection request transmission period to T2'. If the reflected power is equal to or greater than W2' and less than W3', the control unit 201 sets the connection request transmission period to T1'. The reflected power W3' is the greatest, and the reflected power W2' is greater than the reflected power W1' (W3'>W2'>W1'). Further, the period T1' is the shortest, and the period T2" is shorter than the period T3' (T1'<T2'<T3').

Namely, when the digital camera 101 is driven by a commercial power supply, if the antennas 225 and 103 are separated more widely, the control unit 201 sets a shorter connection request transmission period. In other words, when the digital camera 101 is driven by a commercial power supply, the digital camera 101 gives priority to connection with the communication partner 102.

Next, in step S908, the control unit 201 instructs the generation unit 221 to generate and transmit a connection request to the communication partner 102 via the antenna 225 at the changed transmission period. In step S909, the control unit 201 determines whether a successful connection has been established. If the control unit 201 determines a successful connection (YES in step S909), the control unit 201 ends the flow chart of FIG. 9, and the operation proceeds to the flow chart (S701) of FIG. 7 described in the first exemplary embodiment. When transmitting a data signal to the antenna 225 in step S701, the detection unit 223 transmits the data signal based on the reflected power determined in step S902 and the transmission rate determined based on the transmission rate table 801. In this way, the digital camera 101 can transmit data at an appropriate transmission rate starting immediately after establishment of connection. Thus, since it is possible to prevent (reduce) re-transmission caused by an error or transmission of data at a low rate under a low BER condition, the communication efficiency and power consumption can be improved. The display unit 203 may notify the user of establishment of a successful connection. If the control unit 201 does not determine a successful connection (NO in step S909), the operation proceeds to step S910.

In step S910, the control unit 201 determines whether the transmission of the connection request has continued for a certain time. If the certain time has not elapsed yet (NO in step S910), the operation proceeds to step S902, and the detection unit 223 determines the reflected power. If the certain time has elapsed (YES in step S910), the operation proceeds to step S911. In step S911, the display unit 203 notifies the user of an unsuccessful connection, and the control unit 201 ends the flow chart of FIG. 9.

As described above, the control unit 201 changes the connection request transmission interval based on the reflected power determined when the detection unit 223 transmits a signal. Thus, without acquiring information about the reception status of the communication partner 102, the communication apparatus 101 can estimate the distance D between the antennas 225 and 103 and change the transmission interval. Further, when the communication apparatus 101 is driven by a battery and the antennas 225 and 103 are widely separated, since the control unit 201 sets a longer connection request transmission period, reduction of power consumption can be achieved. When the communication apparatus 101 is driven by a commercial power supply and the antennas 225 and 103 are widely separated from each other, since the control unit 201 sets a shorter connection request transmission period, connectivity can be improved.

In a third exemplary embodiment, the digital camera 101 selects an antenna to be used for communication from among a plurality of antennas based on the reflected power.

FIG. 2B illustrates a hardware configuration of the digital camera 101 according to the third exemplary embodiment. In the third exemplary embodiment, units identical to those of the first and second exemplary embodiments are denoted by identical reference characters, and detailed description thereof will be omitted.

A switch 251 connects one of the antennas 252-*a*, 252-*b*, and 252-*c* to the detection unit 223 to transmit a data signal. Further, the switch 251 connects one of the antennas 252-*a*, 252-*b*, and 252-*c* to the demodulation unit 226 to receive a data signal. The antenna 252 forms an induction electric field with the antenna 103 of the cradle 102 to transmit/receive a modulated data signal to/from the cradle 102.

The detection unit 223 detects a reflected wave from each of the antennas 252-*a*, 252-*b*, and 252-*c* and determines intensity (reflected power) of each of the detected reflected waves.

Figure 10:
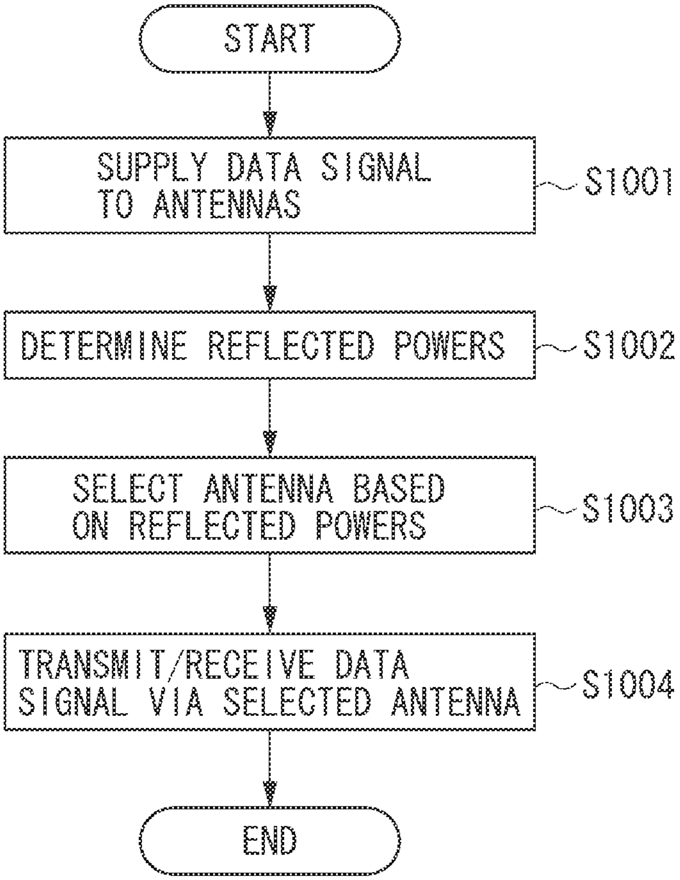
FIG. 10 is a flow chart illustrating communication processing.

FIG. 10 is a flow chart illustrating an operation executed by the control unit 201 reading programs stored in the storage unit 202. The digital camera 101 repeatedly executes the operation illustrated by the flow chart during communication regularly. Alternatively, the digital camera 101 may execute the operation illustrated by the flow chart before establishment of connection.

First, in step S1001, the generation unit 221 generates and supplies a data signal to each of the antennas 252-*a*, 252-*b*, and 252-*c* via the modulation unit 222 and the switch 251. More specifically, the control unit 201 instructs the switch 251 to sequentially select one of the antennas 252-*a*, 252-*b*, and 252-*c* and sequentially connect the selected antenna to the detection unit 223. Each of the antennas 252-*a*, 252-*b*, and 252-*c* transmits the supplied data signal. In this example, each of the antennas transmits a data signal having no payload (content). In this way, since the communication partner 102 does not need to receive the same data many times, the processing load thereof can be reduced.

Next, in step S1002, the detection unit 223 detects the reflected wave from each of the antennas 252-*a*, 252-*b*, and 252-*c* generated when transmitting the data signal and determines intensity (reflected power W) of each of the detected reflected waves. In addition, the detection unit 223 causes the storage unit 202 to store the determined reflected powers. Next, in step S1003, the control unit 201 selects an antenna (252-*a*, for example) that corresponds to the smallest reflected power stored in the storage unit 202. Next, in step S1004, the control unit 201 instructs the switch 251 to connect the selected antenna (252-*a*, for example) to the modulation unit 222 or the demodulation unit 226. Namely, the digital camera 101 transmits/receives the data signal via the selected antenna. In this way, the digital camera 101 can use an antenna estimated to have the lowest BER based on the reflected power for communication.

The present invention may be realized by supplying a computer-readable recording medium in which software program codes realizing the above functions are recorded to a system or an apparatus and causing the system or the apparatus to read and execute the program codes stored in the recording medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-284570 filed Dec. 15, 2009, which is hereby incorporated by reference herein in its entirety.

What is claimed is:

1. A transmission apparatus comprising:

a first antenna;

a transmission unit configured to perform wireless transmission via the first antenna;

a determination unit configured to determine a misalignment between the first antenna and a second antenna of a transmission partner in a case that a housing of the transmission apparatus is in contact with a housing of the transmission partner; and a control unit configured to control the wireless transmission by the transmission unit based on the misalignment determined by the determination unit.

2. The transmission apparatus according to claim 1, wherein the first antenna comprises a plurality of antennas and the control unit selects one of the plurality of antennas that is used by the transmission unit to perform the wireless transmission.

3. The transmission apparatus according to claim 1, further comprising a switch configured to connect the first antenna to a low impedance element when a power source of the transmission apparatus is disconnected.

4. The transmission apparatus according to claim 1, wherein the determination unit determines a reflected power generated in a case the transmission unit supplies power and determines the distance or misalignment based on the reflected power.

5. The transmission apparatus according to claim 1, wherein the control unit changes a transmission rate at which the transmission unit transmits a data signal based on the distance or misalignment.

6. A communication apparatus comprising a first antenna and performing wireless communication in which a reflected power from the first antenna changes depending on a positional relationship between the first antenna of the communication apparatus and a second antenna of a communication partner, the communication apparatus further comprising:

a transmission unit configured to transmit a data signal to the communication partner via the first antenna;

a determination unit configured to determine a reflected power generated when the transmission unit supplies the data signal to the first antenna;

a control unit configured to control the transmission of the data signal by the transmission unit, based on the reflected power determined by the determination unit; and a discrimination unit configured to determine a type of a power source, wherein the control unit changes a transmission interval at which the transmission unit transmits the data signal, based on the reflected power, and wherein, when the discrimination unit determines that the power source is a battery and when the determination unit determines a larger reflected power, the control unit extends the transmission interval.

7. The communication apparatus according to claim 6, wherein the data signal is a connection request.

8. A communication apparatus comprising a first antenna and performing wireless communication in which a reflected power from the first antenna changes depending on a positional relationship between the first antenna of the communication apparatus and a second antenna of a communication partner, the communication apparatus further comprising:

a transmission unit configured to transmit a data signal to the communication partner via the first antenna;

a determination unit configured to determine a reflected power generated when the transmission unit supplies the data signal to the first antenna;

a control unit configured to control the transmission of the data signal by the transmission unit, based on the reflected power determined by the determination unit; and a discrimination unit configured to determine a type of a power source, wherein the control unit changes a transmission interval at which the transmission unit transmits the data signal based on the reflected power, and wherein, when the discrimination unit determines that the power source is a commercial power supply and when the determination unit determines a larger reflected power, the control unit shortens the transmission interval.

9. The communication apparatus according to claim 8, wherein the data signal is a connection request.

10. A control method of a transmission apparatus comprising a first antenna, the control method comprising:

performing wireless transmission via the first antenna;

determining a misalignment between the first antenna and a second antenna of a transmission partner in a case that a housing of the transmission apparatus is in contact with a housing of the transmission partner; and controlling the wireless transmission to the transmission partner based on the determined misalignment.

11. A transmission apparatus comprising:

a plurality of antennas configured to perform wireless transmission;

a determination unit configured to determine a misalignment between each antenna of the plurality of antennas and a partner antenna of a transmission partner in a case that a housing of the transmission apparatus is in contact with a housing of the transmission partner; and a selection unit configured to select one of the plurality of antennas that is used for the wireless transmission with the transmission partner based on the misalignment determined by the determination unit.

12. The transmission apparatus according to claim 11, further comprising a control unit configured to control a switch to select an antenna that corresponds to a smallest reflected power to perform wireless transmission.

13. The transmission apparatus according to claim 11, further comprising;

a switch; and a control unit configured to control the switch to sequentially select each antenna of the plurality of antennas and sequentially connect each selected antenna to the determination unit.

14. The transmission apparatus according to claim 13, wherein the control unit changes a transmission rate at which each of the plurality of antennas performs the wireless transmission based on the distance or the misalignment.

* * * * *